Figure 1:
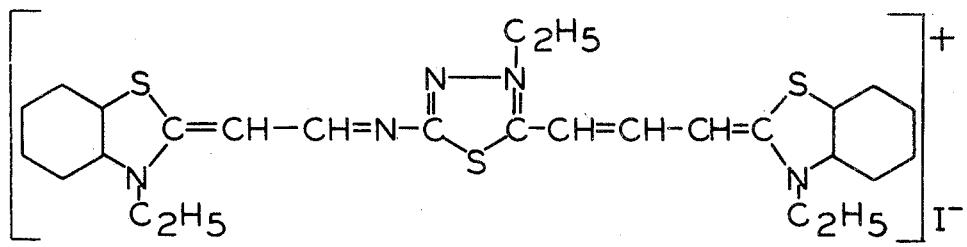
Figure 1:
Figure 2:
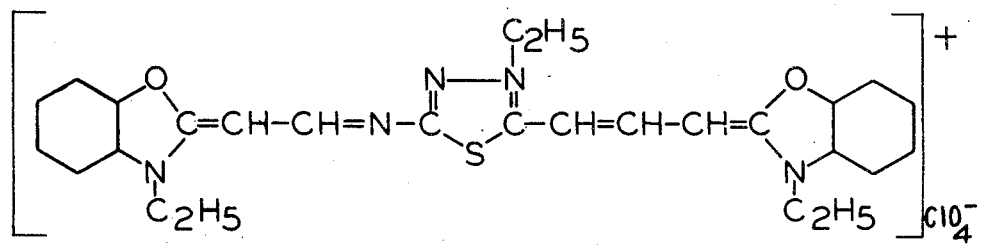
Figure 2:
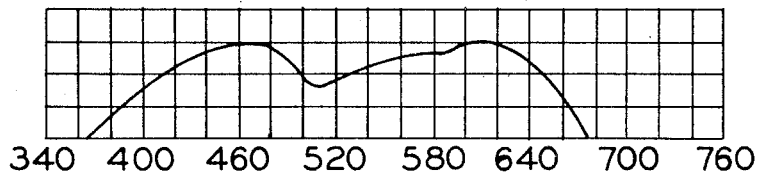
Figure 3:
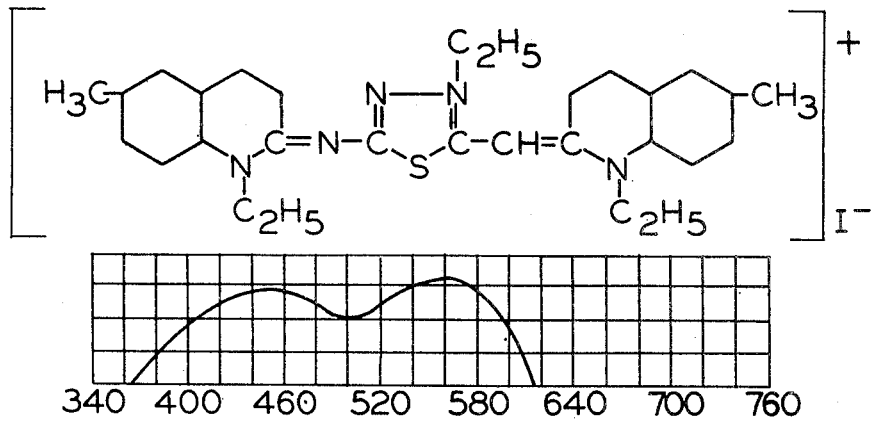
Figure 4:
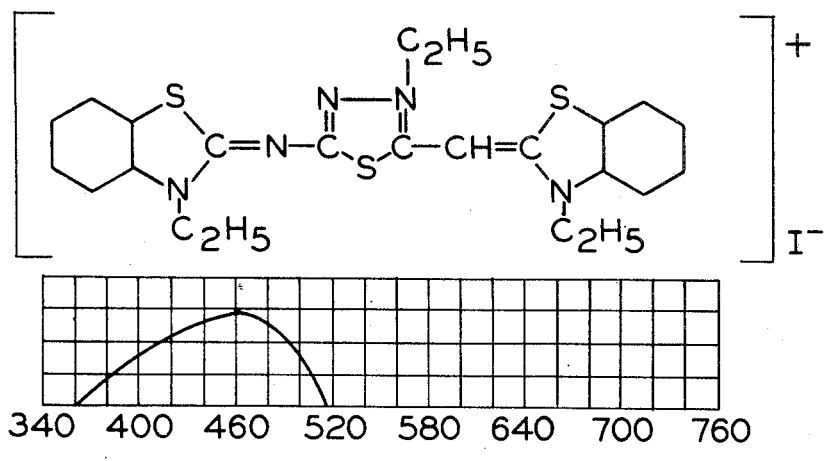
Figure 5:
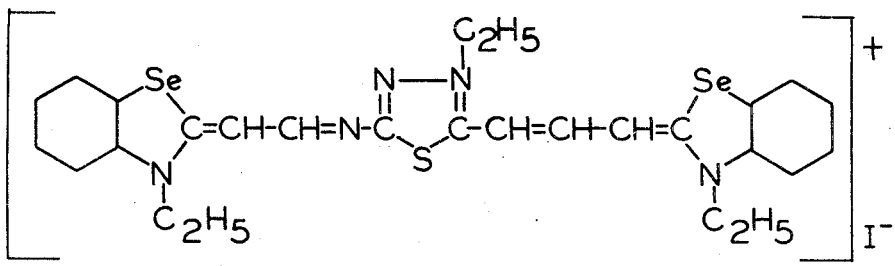
Figure 5:
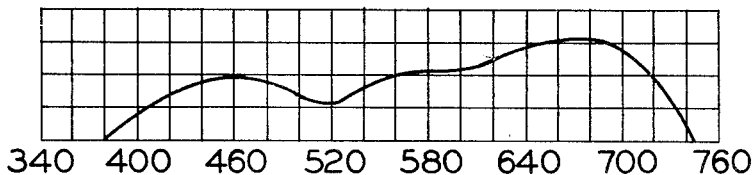
Figure 6:
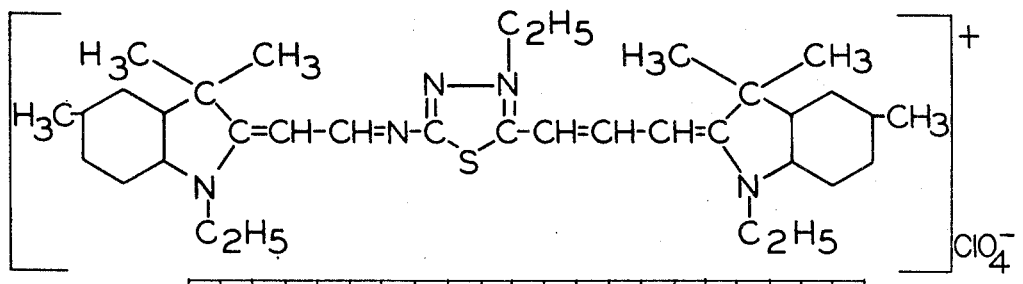
Figure 6:
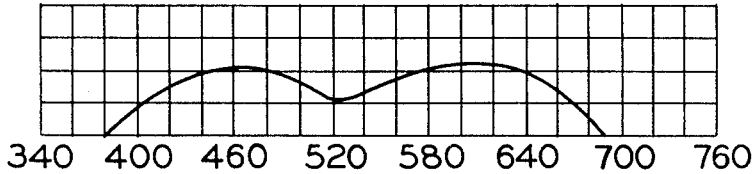

March 7, 1950

A. W. ANISH ET AL 2,500,112

PHOTOGRAPHIC SILVER-HALIDE EMULSIONS
CONTAINING TRINUCLEAR CYANINE DYES

Original Filed Aug. 15, 1946

3 Sheets-Sheet 1

ALFRED W. ANISH
CHARLES A. CLARK
INVENTORS

BY
ATTORNEYS

ALFRED W. ANISH
CHARLES A. CLARK
INVENTOR

March 7, 1950  A. W. ANISH ET AL  2,500,112
PHOTOGRAPHIC SILVER-HALIDE EMULSIONS
CONTAINING TRINUCLEAR CYANINE DYES
Original Filed Aug. 15, 1946  3 Sheets-Sheet 3

ALFRED W. ANISH
CHARLES A. CLARK
INVENTOR

BY
ATTORNEYS

Patented Mar. 7, 1950

2,500,112

UNITED STATES PATENT OFFICE 2,500,112

PHOTOGRAPHIC SILVER-HALIDE EMULSIONS CONTAINING TRINUCLEAR CYANINE DYES

Alfred W. Anish, Vestal, and Charles A. Clark, Binghamton, N. Y., assignors to General Aniline & Film Corporation, New York, N. Y., a corporation of Delaware Original application August 15, 1946, Serial No. 690,832, now Patent No. 2,476,525, dated July 19, 1949. Divided and this application September 25, 1946, Serial No. 699,338

4 Claims. (Cl. 95—7)

This invention relates to photographic gelatino silver-halide emulsions, and more particularly to photographic light-sensitive silver-halide emulsions containing dyes of the trinuclear cyanine type.

Cyanine dyes containing more than two nuclei are already known. Dyes of this category are illustrated, for example, in U. S. Patent 2,155,475, and in French Patent 832,352. It will be noted that in the dyes referred to in the United States patent the nucleus appearing in the dye, in addition to the two terminal nitrogenous heterocyclic nuclei, is aromatic in character. On the other hand, in certain of the dyes of the French potent, the meso nucleus is heterocyclic and of the type known as rhodanine nucleus. In both types of dyes, however, the meso nucleus serves to interrupt the methenyl chain by which the terminal heterocyclic nitrogenous nuclei are linked together.

Rhodacyanine dye salts, which contain in the polymethine chain a rhodanine ring, are also known. These dye salts are prepared by first alkylating a suitable merocyanine and then condensing the alkylated product with a cyclammonium quaternary salt. In this condensation reaction, the alkylmercapto group of the alkylated merocyanine condenses with the methyl group attached in α-position to the nitrogen atom, of a cyclammonium quaternary salt to give the desired dye salt.

Trimethine dyestuffs containing an oxadiazole, substituted by a furan ring, are also known. It is also known that cyanine dye condensations may be carried out through an active amino group of a cyclammonium base or salt to yield dyes of the azamethine type. The simultaneous condensation, however, of both an amino and a methyl group of an oxadiazole or thiadiazole compound with a cyclammonium dye salt to yield trinuclear cyanine dyes has not been previously suggested or described.

We have now discovered a new class of trinuclear cyanine dye salts in which the central nucleus, diazole or triazole, is linked to the other two nuclei by both a methine and an azamethine chain. These new dye salts have properties which are not possessed by the known trinuclear dye salts. For instance, the dyes are not only excellent sensitizers for both orthochromatic and panchromatic film emulsions, but are also excellent sensitizers for color film, being unaffected by the presence of color components, and exhibiting the property of non-migration from the layer in which they are incorporated. Moreover, we have found that these new dyes have appreciable water solubility and are readily removed from the exposed emulsion layer during processing.

An object of the present invention is to provide photographic silver-halide emulsions with trinuclear cyanine dyes containing a diazole or triazole nucleus.

A further object is to provide such dyes which are added to photographic silver-halide emulsions or coated thereon as an over-coating, whereby the sensitivity of the emulsion is increased.

A still further object is to provide photo-sensitizing dyestuffs having appreciable water solubility and readily removed from the exposed emulsion layer during processing.

Other objects and advantages of this invention will become apparent by reference to the following specification in which its preferred details and embodiments are described.

This invention is predicated upon our discovery that 1 mol of a 3,4-diazole or 1,3,4-triazole salt, containing an amino group in 2-position and a methyl group in 5-position with the nitrogen atom in 4-position substituted by an alkyl or aralkyl group, can be condensed with 2 mols of a nitrogenous heterocyclic dye salt of the type used in cyanine dyes. This discovery is wholly unexpected and surprising, since 3,4-diazole and 1,3,4-triazole salts, with the N atom in 3- or 4-position substituted by an alkyl or aralkyl group and containing methyl groups in the 2- and 5-positions are only reactive through one of these groups, i. e., through the methyl group in the 2- or 5-position, but not through both groups. Similarly, 3,4-diazole or 1,3,4-triazole salts containing an amino group in 2-position and a methyl group in 5-position, and wherein the nitrogen atom in 3-position is substituted by an alkyl or aralkyl group, are reactive only through the amino group.

The trinuclear cyanine dyes prepared according to the present invention are characterized by the following general formula:

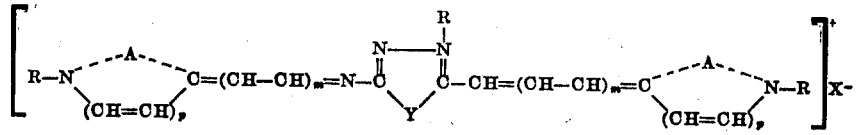

wherein A represents the atoms necessary to complete a nitrogenous heterocyclic system of the type used in the preparation of cyanine dyes, such as, for example, oxazole, oxazoline, thiazole, thiazoline, selenazole, selenazoline, benzothiazole, benzoselenazole, benzoxazole, naphthothiazole, naphthoselenazole, indolenine, pyridine and its polycyclic homologues such as quinoline and naphthoquinoline, and the like. The polycyclic compounds of these series may also be substituted in the carbocyclic rings with one or more groups, such as alkyl, as below, aryl, i. e., phenyl, etc., amino, hydroxy, alkoxy, e. g., methoxy, ethoxy, propoxy, etc., and methylenedioxy groups. R is a hydrocarbon group, for example, alkyl group, e. g., methyl, ethyl, propyl, butyl, amyl, and the like, or aralkyl group, e. g., benzyl, phenylethyl, and the like, X represents an anionic acid radical, e. g., Cl, Br, I, ClO$_4$, SO$_4$CH$_3$, SO$_4$C$_2$H$_5$, SO$_3$C$_6$H$_4$CH$_3$, and the like, Y represents either oxygen, sulfur, or NR$_1$, wherein R$_1$ is either hydrogen or an alkyl of the same value as R, $m$ represents 0, 1, or 2, and $p$ represents 0 or 1.

The process of preparing the above trinuclear cyanine dyes comprises condensing, at room temperature or by heating as on a steam bath or under reflux conditions, 1 mol of a cyclammonium quaternary salt of 2-amino-5-methyl-3,4-diazole, or 1,3,4-triazole with 2 mols of a cyclammonium quaternary cyanine dye intermediate, of the type used in the preparation of cyanine dyes, in the presence of an acid binding agent such as a nitrogenous heterocyclic base containing a small quantity of a tertiary base which may include a small quantity of acetic acid or acetic anhydride.

The anions of the dye salts thus obtained are readily converted into different anions by methods well-known in the art.

The cyclammonium quaternary salts of 2-amino-5-methyl-3,4-diazoles and 1,3,4-triazoles utilized in the condensation reaction are characterized by the following general formula:

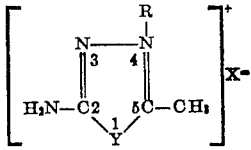

wherein R, X and Y have the same values as above, and are obtained by quaternizing any one of the following diazoles as will be pointed out hereinafter.

J. Prakt. Chem. 122, p. 289–318, 1929

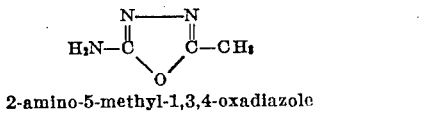

2-amino-5-methyl-1,3,4-oxadiazole

Ber. 29, p. 2513–4

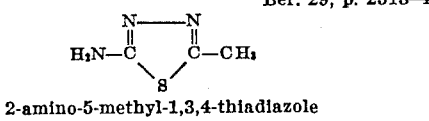

2-amino-5-methyl-1,3,4-thiadiazole

Ber. 26, 2599

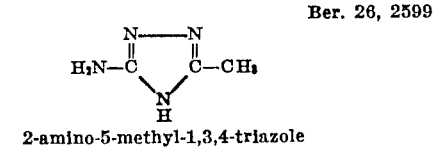

2-amino-5-methyl-1,3,4-triazole

The quaternary salt of 2-amino-5-methyl-1,3,4-triazole is prepared by heating, under pressure, the triazole with an alkylating agent, such as, methyl or ethyl iodide, sulfate, methyl-p-toluenesulfonate and the like.

The cyclammonium salts of the type used or proposed for the production of cyanine dyes, and utilized in accordance with the present invention, are represented by the following general formula:

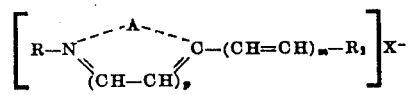

wherein A, R, $m$, $p$, and X have the same values as above, and R$_2$ represents an anilido radical, i. e., anilido, acetanilido or 4-chloroacetanilido, and hydrocarbon mercapto groups, e. g., methylmercapto, ethylmercapto, propylmercapto, phenylmercapto, naphthylmercapto, and the like, R$_2$ being anilido only when $m$ is 1 or 2.

As examples of represenative cyclammonium quaternary cyanine dye salt intermediates falling within the above configuration the following may be mentioned:

4,5-diphenyl-3-ethyl-2-methylmercapto thiazolinium iodide
2-[β-anilidovinyl]-3-ethyl-4-methyl thiazolinium iodide
1-ethyl-4-methylmercapto quinolinium iodide
3-ethyl-2-methylmercapto pyridinium iodide
2-[β-anilidovinyl]-3,3-dimethyl-1-ethyl indoleninium iodide
2-[4-acetanilidobutadienyl]-3-ethyl-6-methoxy-benzothiazolium iodide
2-[β-acetanilidovinyl]-3-phenoxyethyl benzothiazolium iodide
2-[4-acetanilidobutadienyl]-3-ethyl-benzoselenazolium iodide
3-ethyl-2-[β-methylmercaptovinyl] benzoselenazolium iodide
2-[β-acetanilidovinyl]-3-ethyl-naphthothiazolium iodide
2-[β-anilidovinyl]-3-ethyl benzoxazolium iodide
4-cyano-1-ethyl quinolinium iodide
2-[β-acetanilidovinyl]-3,3'-dimethyl-1-ethyl indoleninium iodide
3-ethyl-2-[4-methylmercaptobutadienyl]-5-phenyl-benzoxazolium iodide
2-[β-anilidovinyl]-3-methyl-thiazolinium iodide
2-[β-anilidovinyl]-3-ethyl-4,5-benzo-benzoxazolium iodide
2-[β-acetanilidovinyl]-3-ethyl-oxazolium iodide
2-[β-acetanilidovinyl]-3-ethyl-selenazolium iodide
2-[βacetanilidovinyl]-3-ethyl-4,5-benzo-benzoselenazolium iodide The above cyclammonium quaternary cyanine dye salt intermediates are well-known to the art, and hence the methods for their preparation need not be discussed herein. While the above dye intermediates are disclosed as being in the form of the preferred ethiodides, it is to be understood that they may also be employed in the form of the other quaternary salts previously mentioned.

As acid binding agents employed for the preparation of the dyes of the present invention, the following may be advantageously employed: pyridine, methylpyridine, dimethylpyridine, ethylpyridine, ethylmethylpyridine, trimethylpyridine, quinoline, and the like, containing a tertiary aliphatic base such as triethylamine, tripropylamine, tributylamine, etc., as a catalyst. The tertiary base may also include, if so desired, a small quantity of acetic acid or acetic anhydride. In general, the amount of condensing (acid binding) agent used may vary within wide limits, e. g., from 1 to 25 mols. Concentrations ranging from 1 mol to about 15 mols are preferred.

In the preparation of these new trinuclear cyanine dyes, the 2-amino-5-methyl-3,4-diazole and 2-amino-5-methyl-1,3,4-triazole bases are converted into their corresponding alkyl or aralkyl quaternary salts by heating the base with an alkyl or aralkyl halide, usually employed in such a reaction, in a bomb or sealed tube at a temperature ranging from 100° to 120° C. for 3 to 6 hours.

The quaternization of the diazole base must be carefully controlled, otherwise an undesirable quantity of the isomeric form of the quaternary salt is obtained. It is believed that the reactive form, leading to the trinuclear cyanine dyes of the present invention, has the following configuration:

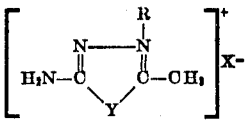

As a by-product (isomeric form) of this reaction, a secondary quaternary salt is isolated, which probably has the following configuration:

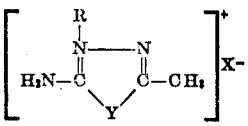

This by-product is not useful in the preparation of the dyes of the present invention, since it undergoes dye condensations only through the amino group.

The following examples describe, in detail, the method for preparing the quaternated diazoles and triazoles, and the trinuclear cyanine dyes therefrom, but it is to be understood that they are presented merely for the purpose of illustration and are not to be construed as limitative.

*Example I*

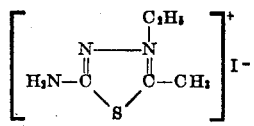

2-amino-4-ethyl-5-methyl-1,3,4-thiadiazolium iodide

A mixture of 6 grams of 2-amino-5-methyl-1,3,4-thiadiazole and 15 grams of ethyl iodide was heated in a sealed bomb, the temperature being carefully controlled in the range of 105°–110° C., for 4 hours. Upon cooling, the product was filtered and the residue extracted with several 2 cc. portions of anhydrous acetone until about 20 cc. had been consumed. The acetone extract was precipitated with anhydrous ethyl ether and dried. The dried product is useful in preparing the trinuclear cyanine dyes of the present invention, since the condensation reaction is simultaneously brought about through the two reactive groups, namely amino and methyl groups.

The acetone insoluble portion is thought to be 2-amino-3-ethyl-5-methyl - 1,3,4-thiadiazolium iodide, and is incapable of undergoing a condensation reaction through both the amino and methyl groups. It did, however, undergo a condensation reaction through the amino group only.

*Example II*

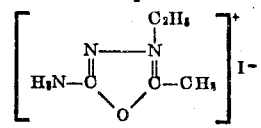

2-amino-4-ethyl-5-methyl-1,3,4-oxadiazolinium iodide

Example I was repeated with the exception that an equivalent quantity of 2-amino-5-methyl-1,3,4-oxadiazole was substituted for 2-amino-5-methyl-1,3,4-thiadiazole.

*Example III*

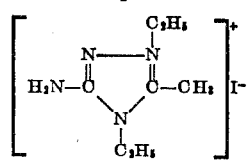

1,4-diethyl-2-amino-5-methyl-1,3,4-triazolium iodide

Example I was repeated with the exception that an equivalent quantity of 1-ethyl-2-amino-5-methyl-1,3,4-triazole was substituted for 2-amino-5-methyl-1,3,4-thiadiazole.

While the above diazolinium salts have been prepared in the form of the preferred iodides, it is to be understood that they may also be prepared in the form containing other anionic acid radicals. For example, instead of employing ethyl iodide as the quaternating agent, methyl, ethyl, or propyl chloride, bromide, dimethyl sulfate, benzyl bromide, methyl p-toluene-sulfonate, and the like may also be employed.

The preparation of the trinuclear cyanine dyes, while utilizing the diazolinium salts as above prepared, is illustrated by the following examples.

*Example IV*

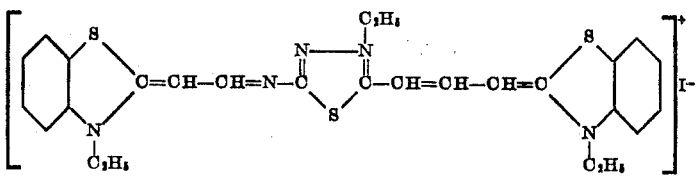

One gram of 2-amino-4-ethyl-5-methyl-1,3,4-thiadiazolium iodide and 2 grams of 2-(β acetanilidovinyl)-3-ethyl-benzothiazolium iodide were dissolved in 20 cc. of pyridine and 2 cc. of triethylamine added. The mixture was heated to reflux for 5 minutes, cooled, and diluted with several volumes of water. The green crystals which separated out were filtered off and recrystallized from ethyl alcohol. The dye sensitized a silver-bromoiodide emulsion to 720 mμ with a maximum at 680 mμ.

*Example V*

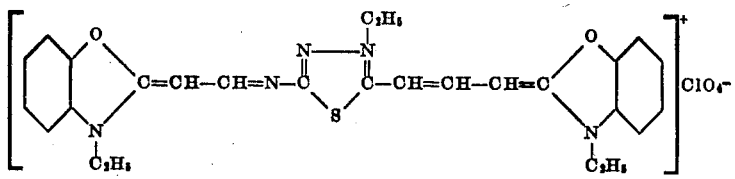

One gram of 2-amino-4-ethyl-5-methyl-1,3,4-thiadiazolium iodide and 2.0 grams of 2-(β- acetanilidovinyl)-3-ethyl benzothiazolium iodide were dissolved in 20 cc. of pyridine and 2 cc. of triethylamine added. The mixture was heated over steam at 50° C., for 30 minutes, cooled, and diluted with about 60 cc. of water. The leafy crystals which separated out were filtered, and recrystallized from ethyl alcohol. The dye crystals were dissolved in methanol and precipitated as the perchlorate dye salt and purified by several crystallizations from methyl alcohol. The dye sensitized a silver-bromoiodide emulsion to 670 mµ, with a maximum at 620 mµ.

*Example VI*

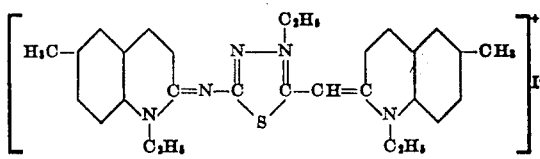

Six grams of 2 - methylmercapto - 1 - ethyl - 6-methyl quinolinium iodide and 2 grams of 2 - amino - 4 - ethyl - 5 - methyl - 1,3,4 - thia - diazolium iodide were dissolved in 80 cc. of pyridine and 1 cc. of triethylamine added. The mixture was heated over steam for 1 hour, cooled, and diluted with water. The crystals which separated out were filtered off and recrystallized from n-butanol. The dye sensitized a silver-bromoiodide emulsion to 610 mµ, with a maximum at 560 mµ.

*Example VII*

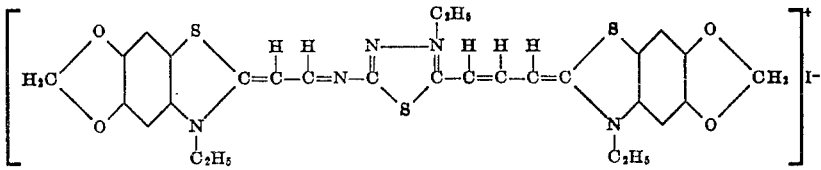

Two grams of 2-amino-4-ethyl-5-methyl-1,3,4-thiadiazolium iodide and 8 grams of 2-(β-acetanilidovinyl)-3-ethyl-5,6-methylene-dioxy benzothiazolium were dissolved in 60 cc. of pyridine and 2 cc. of triethylamine added. The mixture was heated under reflux for 3–5 minutes, cooled, and diluted with water. The crystals which separated out were filtered off and recrystallized from methanol. The dye sensitized a silver-bromoiodide emulsion to 740 mµ, with a maximum at 700 mµ.

*Example VIII*

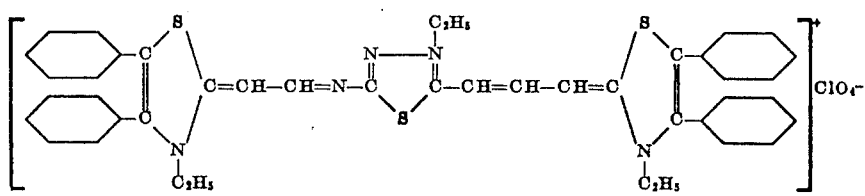

Five grams of 2-(β-anilidovinyl)-3-ethyl-4,5-diphenyl thiazolium iodide and 1.4 grams of 2 - amino - 4 - ethyl - 5 - methyl - 1,3,4 - thiadiazolium iodide were dissolved in 50 cc. of pyridine containing 2 cc. of triethylamine and 1 cc. of acetic anhydride. The mixture was heated under reflux for 5 minutes, cooled, and diluted with water. The crystals which separated out were filtered off and recrystallized from ethyl alcohol. The recrystallized product was dissolved in methanol and precipitated as the perchlorate dye salt. The dye sensitized a silver-bromoiodide emulsion to 685 mµ, with a maximum at 635 mµ.

*Example IX*

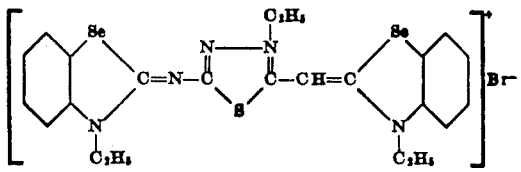

One gram of 2-methylmercapto-3-ethyl-benzoselenazolium iodide and 0.3 gram of 2-amino-4-ethyl-5-methyl-1,3,4-thiadiazolium iodide were dissolved in 10 cc. of pyridine containing 1 cc. of triethylamine. The mixture was heated over an open flame to drive off the mercaptan by-product. The reaction mixture was diluted with water, and the dye which precipitated was filtered off and converted to the bromide salt. The dye was purified and crystallized from ethyl alcohol. The dye sensitized a silver-bromoiodide emulsion to 520 mµ, with a maximum at 480 mµ.

*Example X*

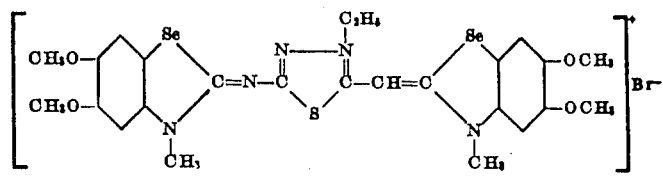

Six grams of 2-methylmercapto-3-ethyl-5,6-dimethoxy benzoselenazolium p-toluenesulfonate and 2.7 grams of 2-amino-4-ethyl-5-methyl-1,3,4-thiadiazolium iodide were dissolved in 50 cc. of pyridine and 2 cc. of triethylamine. The mixture was heated over steam for 1 hour, cooled, and diluted with 2 volumes of water. The yellow crystals which separated out were filtered off and recrystallized from methanol after conversion to the bromide salt. The dye sensitized a silver-bromoiodide emulsion to 530 mµ, with a maximum at 480 mµ.

Example XI

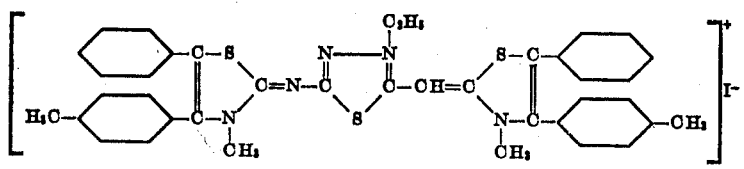

One gram of 2-methylmercapto-3-methyl-4(p)-tolyl-5-phenyl thiazolium iodide and 0.2 gram of 2-amino-4-ethyl-5-methyl-1,3,4-thiadiazolium iodide were dissolved in 10 cc. of pyridine and 1 cc. of triethylamine added. The mixture was heated under reflux until the methyl mercaptan by-product was dissipated. After cooling and diluting with water, the reaction mixture was filtered and the orange crystals recrystallized from methanol until pure. The dye sensitized a silver-bromoiodide emulsion to 530 m$\mu$, with a maximum at 480 m$\mu$.

Example XII

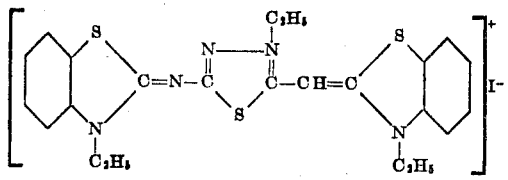

One gram of 2-methylmercapto-3-ethyl benzothiazolium iodide and 0.25 gram of 2-amino-4-ethyl-5-methyl-1,3,4-thiadiazolium iodide were dissolved in 10 cc. of pyridine containing 1 cc. of triethylamine. The mixture was heated under reflux until the methyl mercaptan was dissipated. After cooling the reaction mixture and diluting with water, the crystalline dye was filtered and purified by crystallization from methanol. The dye sensitized a silver-bromoiodide emulsion to 510 m$\mu$, with a maximum at 470 m$\mu$.

Example XIII

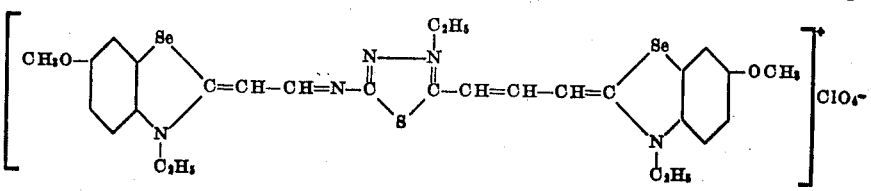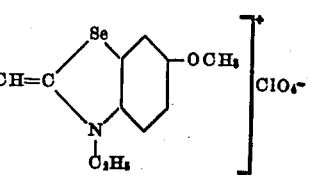

One gram of 2-($\beta$-anilidovinyl)-3-ethyl-6-methoxy benzoselenazolium iodide and 0.25 gram of 2-amino-4-ethyl-5-methyl-1,3,4-thiadiazolium iodide were dissolved in 2 cc. of pyridine containing 0.1 cc. of acetic anhydride and 0.1 cc. of triethylamine. The mixture was heated under reflux for 1 minute, cooled, and diluted with water. The crystals which separated out were dissolved in methanol and the dye converted to the perchlorate salt, and then purified by recrystallizing from methanol. The dye sensitized a silver-bromoiodide emulsion to 730 m$\mu$, with a maximum at 690 m$\mu$.

Example XIV

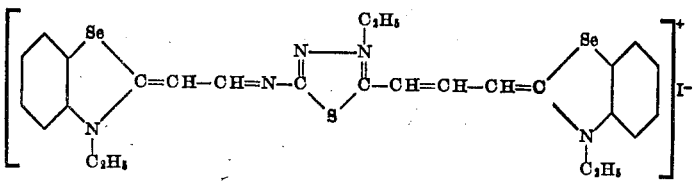

One gram of 2-($\beta$-acetanilidovinyl)-3-ethyl-benzoselenazolium iodide and 0.25 gram of 2-amino-4-ethyl-5-methyl-1,3,4-thiadiazolium iodide were dissolved in 25 cc. of pyridine containing 1 cc. of triethylamine. The mixture was heated under reflux for 3 minutes, cooled, and the dye precipitated by the addition of 2 volumes of ether. The separated residue was washed several times with water while allowing the tacky solid to gradually solidify before filtering. The solid was then purified by boiling out with several 5 cc. portions of methanol. The final residue was crystallized several times from methanol to obtain the pure dye. The dye sensitized a silver-bromoiodide emulsion to 730 m$\mu$, with a maximum at 680 m$\mu$.

Example XV

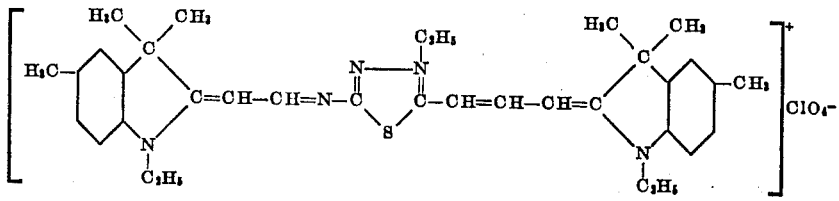

Six grams of 2-($\beta$-anilidovinyl)-1-ethyl-3,3,5-trimethyl indoleninium iodide and 2.5 grams of 2-amino-4-ethyl-5-methyl-1,3,4-thiadiazolium iodide were dissolved in 100 cc. of pyridine containing 2 cc. of acetic anhydride and 4 cc. of triethylamine. The mixture was heated on a steam bath for 5 minutes, cooled, and the dye precipitated by the addition of several volumes of ether. The precipitate was dissolved in 50-75 cc. of methanol, and reprecipitated as the perchlorate salt by the addition of an aqueous solution of potassium perchlorate. The crystals which separated out were filtered off and recrystallized from ethyl alcohol. The dye sensitized a silver-bromoiodide emulsion to 680 m$\mu$, with a maximum at 620 m$\mu$.

Example XVI

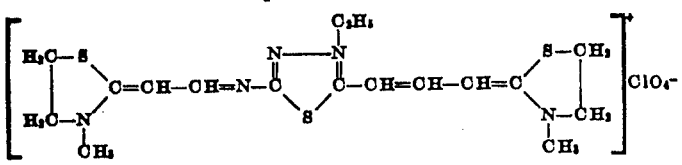

Four grams of 2-(β-anilidovinyl)-3-methyl-thiazolinium iodide and 1.5 grams of 2-amino-4-ethyl-5-methyl-1,3,4-thiadiazolium iodide were dissolved in 15 cc. of pyridine containing 1 cc. of acetic anhydride and 3 cc. of triethylamine. The mixture was gently heated on a steam bath for several minutes, cooled, and the dye precipitated by the addition of 2 volumes of ether. The precipitate was dissolved in an adequate amount of hot water and the oily impurities separated. The aqueous solution of the dye was precipitated as the perchlorate salt by the addition of an aqueous solution of potassium perchlorate. The perchlorate solution which separated out from the aqueous solution was filtered off and recrystallized from n-butanol. The dye sensitized a silver-bromoiodide emulsion to 650 mµ, with a maximum at 600 mµ.

Example XVII

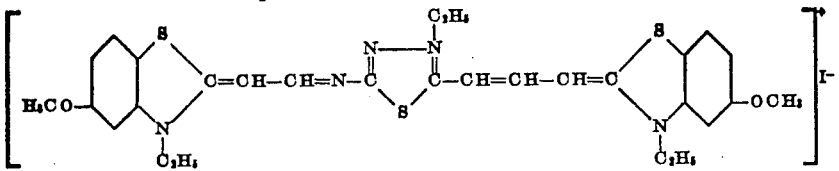

One gram of 2-(β-acetanilidovinyl)-3-ethyl-5-methoxy benzothiazolium iodide and 0.3 gram of 2-amino-4-ethyl-5-methyl-1,3,4-thiadiazolium iodide were dissolved in 5 cc. of pyridine containing 0.3 cc. of acetic anhydride and 1 cc. of triethylamine. The mixture was thoroughly stirred with a glass rod for 5-10 minutes but not heated. The blue dye solution which formed was diluted with water and the dye crystals filtered. The residue was purified by recrystallizing from methanol. The dye sensitized a silver-bromoiodide emulsion to 720 mµ, with a maximum at 690 mµ.

Example XVIII

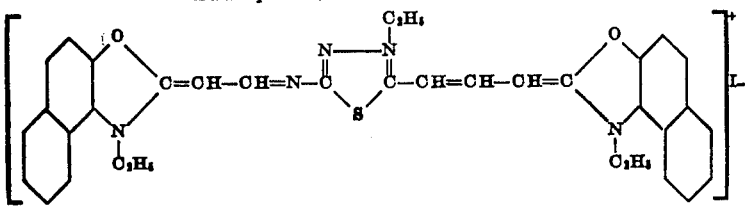

One gram of 2-(β-acetanilidovinyl)-3-ethyl-4,5-benzo-benzoxazolium iodide and 0.3 gram of 2-amino-4-ethyl-5-methyl-1,3,4-thiadiazolium iodide were dissolved in 5 cc. of pyridine containing 0.5 cc. of triethylamine and 0.5 cc. of acetic anhydride. The mixture was heated under reflux for 3 minutes, after which time 1 cc. of triethylamine was added and the mixture heated for an additional 2 minutes. Upon cooling, the dye crystals were precipitated by adding 2 volumes of ether to the reaction mixture. The dye chrystals which separated out were filtered off and recrystallized from methanol. The dye sensitized a silver-bromoiodide emulsion to 660 mµ, with a maximum at 630 mµ.

Example XIX

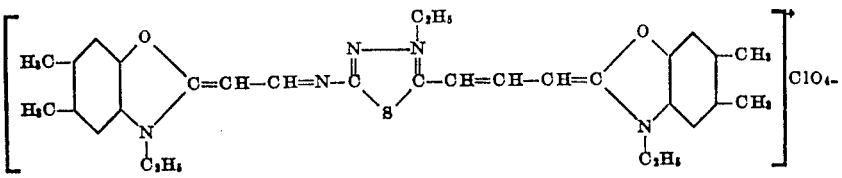

Four grams of 2-(β-acetanilidovinyl)-3-ethyl-5,6-dimethyl benzoxazolium iodide and 1.5 grams of 2-amino-4-ethyl-5-methyl-1,3,4-thiadiazolium iodide were dissolved in 50 cc. of pyridine containing 2 cc. of triethylamine. The mixture was heated under reflux for 5 minutes, cooled, and diluted with 2-3 volumes of water. The dye which separated out was filtered off and recrystallized from methanol, redissolved in methanol and reprecipitated out as the perchlorate salt by the addition of an aqueous solution of potassium perchlorate. The perchlorate dye crystals were further purified by recrystallizing from methanol. The dye sensitized a silver-bromoiodide emulsion to 680 mµ, with a maximum at 630 mµ.

Example XX

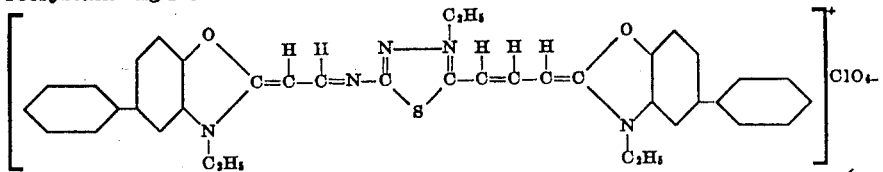

One gram of 2-(β-acetanilidovinyl)-3-ethyl-5-phenyl benzoxazolium iodide and 0.25 gram of 2-amino-4-ethyl-5-methyl-1,3,4-thiadiazolium iodide were dissolved in 12 cc. of pyridine containing 1 cc. of triethylamine and 0.5 cc. of acetic anhydride. The mixture was heated over a steam bath for 5 minutes, cooled, and diluted with 3 volumes of water. The crystals which separated out were filtered off and recrystallized from methanol as the perchlorate salt. The dye

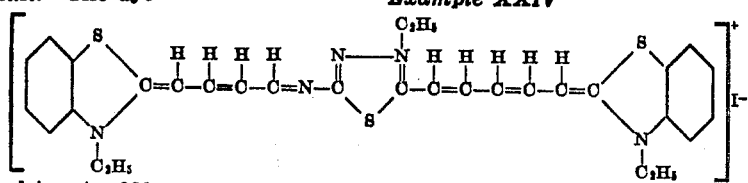

sensitized a silver-bromoiodide emulsion to 660 m$\mu$, with a maximum at 610 m$\mu$.

*Example XXI*

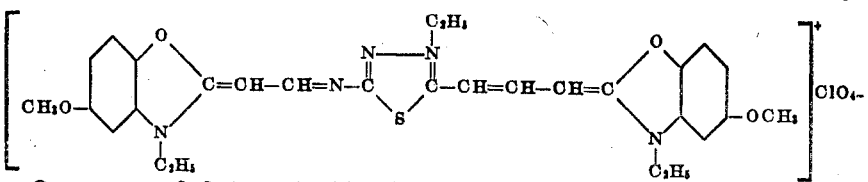

One gram of 2-($\beta$-acetanilidovinyl)-3-ethyl-5-methoxy benzoxazolium iodide and 0.3 gram of 2-amino-4-ethyl-5-methyl-1,3,4-thiadiazolium iodide were dissolved in 10 cc. of pyridine containing 1 cc. of triethylamine and the solution agitated with a glass rod for 30 minutes at room temperature. The dye in solution was precipitated by the addition of ether. The liquor was decanted and the residue washed with water and then dissolved in cold methanol. One cc. of a 20% aqueous solution of sodium perchlorate was added to the filtered methanol solution. The trinuclear dye precipitated as the perchlorate salt and was purified by recrystallizing from hot methanol. The dye sensitized a silver-bromoiodide emulsion to 650 m$\mu$, with a maximum at 560 m$\mu$.

*Example XXII*

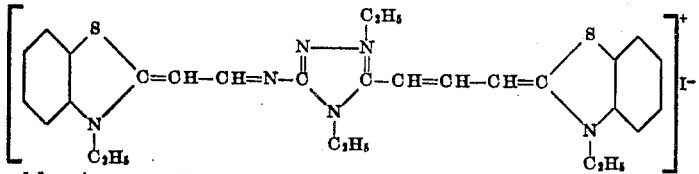

One gram of 2-($\beta$-acetanilidovinyl)-3-ethyl-5-methyl-benzothiazolium iodide and 0.3 gram of 2-amino-4-ethyl-5-methyl-1,3,4-thiadiazolium iodide were dissolved in 10 cc. of pyridine containing 1 cc. of triethylamine. The mixture was heated under reflux for 5 minutes, cooled and diluted with several volumes of water. The crystals which separated out were filtered off and recrystallized from methanol. The dye sensitized a silver-bromoiodide emulsion to 720 m$\mu$, with a maximum at 690 m$\mu$.

*Example XXIII*

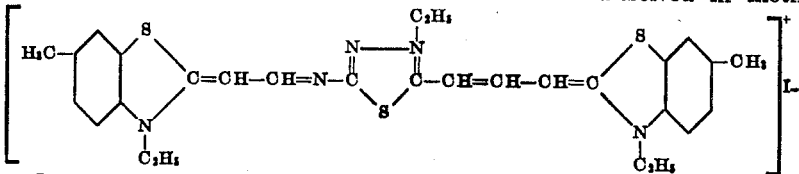

Example XXII was repeated with the exception that 0.3 gram of 2-amino-4-ethyl-5-methyl-1,3,4-oxadiazolium iodide was substituted for 0.3 gram of 2-amino-4-ethyl-5-methyl-1,3,4-thiadiazolium iodide.

*Example XXIV*

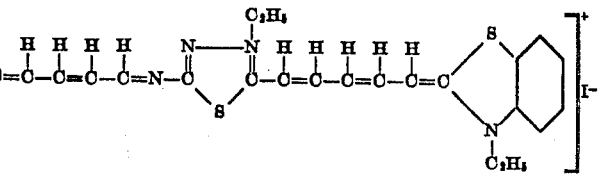

One gram of 2-[4]-acetanilido butadienyl-3-ethyl-benzothiazolium iodide and 0.3 gram of 2-amino-4-ethyl-5-methyl-1,3,4-thiadiazolium iodide were dissolved in 10 cc. of pyridine containing 0.5 cc. of triethylamine. The mixture was heated under reflux for 3–5 minutes, cooled, and diluted with 2–3 volumes of water. The crystals which separated out were filtered off and recrystallized from propanol. The dye sensitized a silver-bromo-iodide emulsion to 720 m$\mu$, with a maximum at 690 m$\mu$.

*Example XXV*

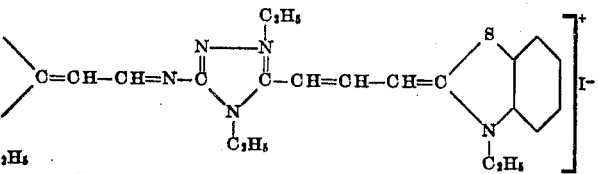

Example IV was repeated with the exception that an equivalent amount of 1,4-diethyl-2-amino-5-methyl-1,3,4-triazolium iodide was substituted for 2-amino-4-ethyl-5-methyl-1,3,4-thiadiazolium iodide.

In the preparation of emulsions containing these trinuclear cyanine dyes, the dye may be dissolved in methyl or ethyl alcohol and the alcoholic solution containing from 5 to 50 milligrams of the dye added to a liter of emulsion. While in general practice it may not be necessary to add the dye in the amounts larger than those above given, generally, for satisfactory results, amounts ranging from 5 to 50 milligrams are sufficient to obtain the maximum sensitizing effect. However, we do not wish to limit our invention to the quantities just indicated as the most suitable amount will, in each case, be found by a few comparative experiments. The dyes may be added to the emulsion in form of solutions. Suitable solvents as indicated in the examples are the alcohols, for instance, methyl or ethyl alcohol which may be anhydrous or diluted with a small volume of water. In actual practice, the dyes are applied to the emulsion during any stage of its production. However, they are preferably added to the finished emulsion before coating.

The diagrammatic spectrograms constituting the accompanying drawing illustrate the regions of the spectrum to which the trinuclear cyanine dyes will sensitize a silver-bromo-iodide emulsion containing about 4–5% of silver halide and the extent of the sensitization at various wavelengths. The six figures of this drawing illustrate the sensitizing properties of the trinuclear cyanine dyestuffs of Examples V, VI, XII, XIV, and XV.

This application is a division of our co-pending application Serial No. 690,832, filed August 15, 1946, now Patent No. 2,476,525 of July 19, 1949.

While there have been pointed out above certain preferred embodiments of the invention, the same is not limited to the foregoing examples, illustrations or to the specific details given therein, but is capable of variations and modifications as to the reactants, proportions and conditions employed. Accordingly, it is intended that the invention be defined only by the accompanying claims.

We claim:

1. A photographic gelatino silver-halide emulsion which contains a trinuclear cyanine dye characterized by the following general formula:

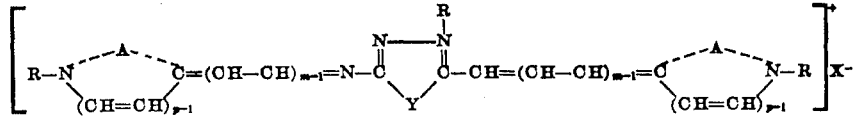

wherein A is the residue of a heterocyclic nitrogenous compound, R represents a member selected from the class consisting of alkyl and aralkyl groups, X represents an anionic acid radical, Y represents a member selected from the class consisting of oxygen, sulfur, and $NR_1$, wherein $R_1$ is a member selected from the class consisting of hydrogen and alkyl groups, $m$ represents a positive integer of from 1 to 3, and $p$ represents a positive integer of from 1 to 2.

2. A photographic gelatino silver-halide emulsion which contains a trinuclear cyanine dye characterized by the following formula:

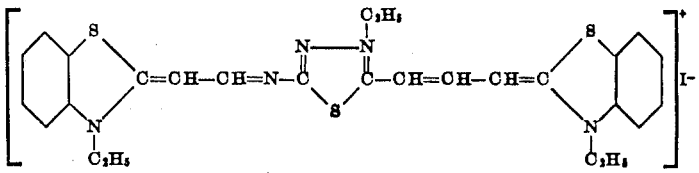

3. A photographic gelatino silver-halide emulsion which contains a trinuclear cyanine dye characterized by the following formula:

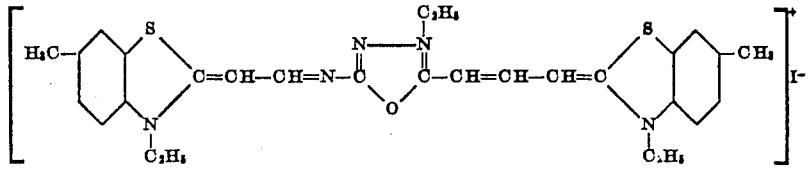

4. A photographic gelatino silver-halide emulsion which contains a trinuclear cyanine dye characterized by the following formula:

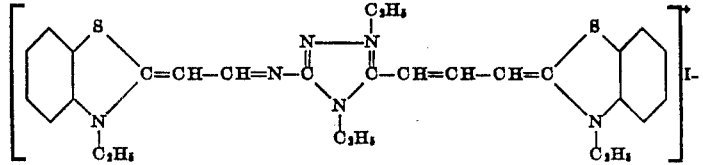

ALFRED W. ANISH.
CHARLES A. CLARK.

REFERENCES CITED

The following references are of record in the file of this patent:

UNITED STATES PATENTS

| Number | Name | Date |
|---|---|---|
| 2,166,736 | White et al. | July 18, 1939 |
| 2,263,018 | Sprague | Nov. 18, 1941 |
| 2,355,654 | Kendall et al. | Aug. 15, 1944 |